Dec. 23, 1958     L. P. DUNCAN     2,865,391
MEANS FOR FILLING A BULK MILK CONTAINER
FROM ONE OR MORE MILK CANS
Filed Feb. 16, 1955     2 Sheets-Sheet 1
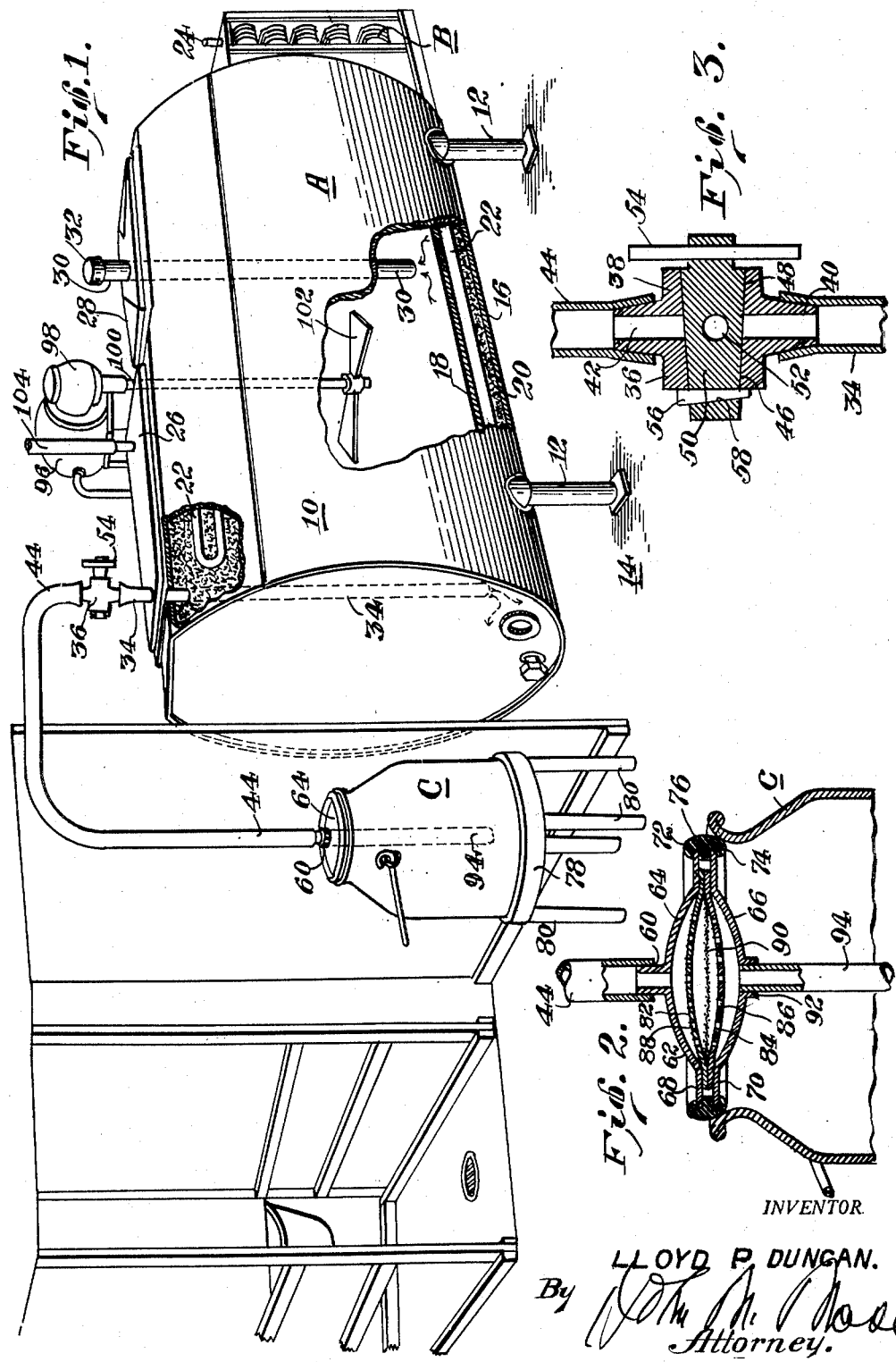
INVENTOR.
LLOYD P. DUNCAN.
By
Attorney.

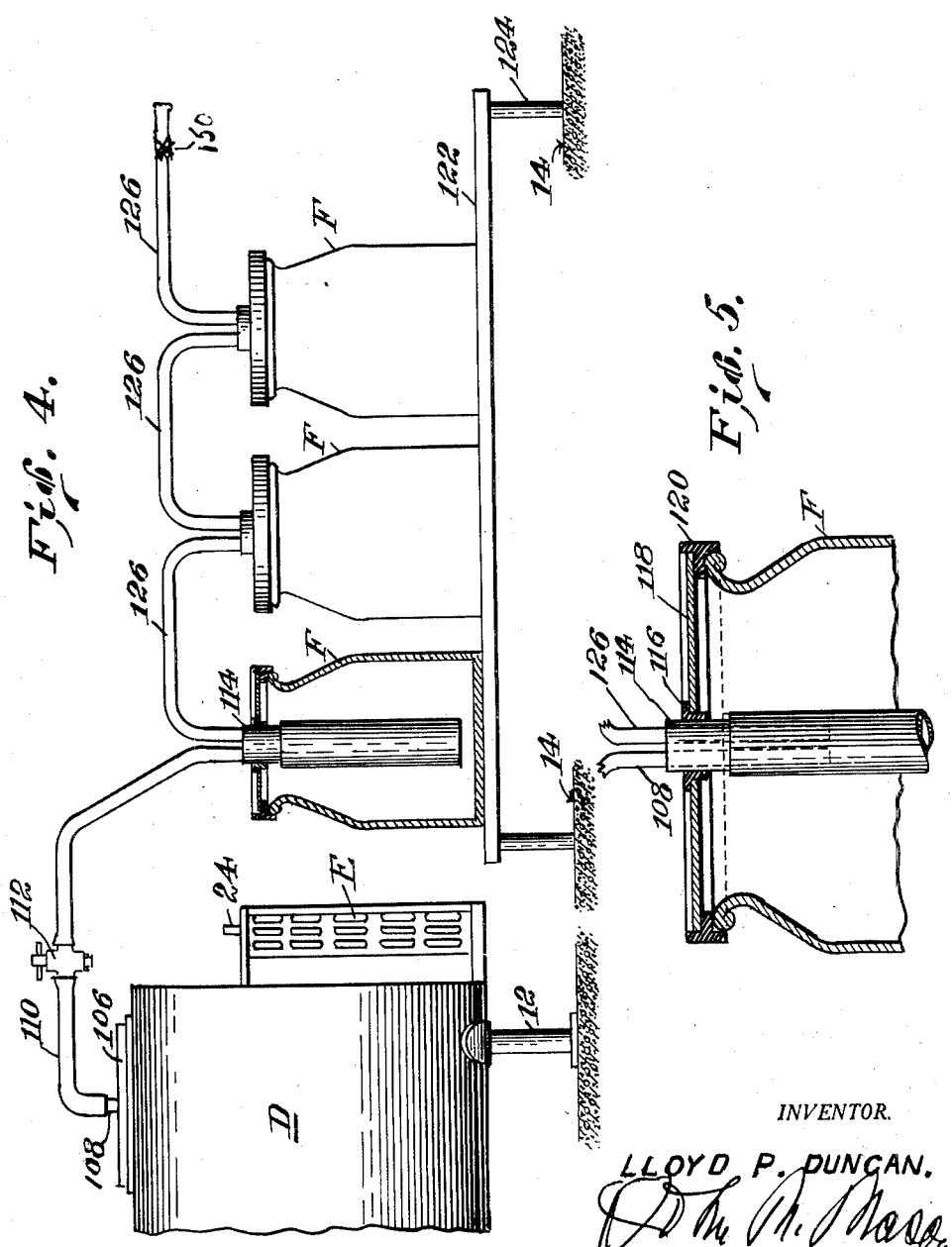

United States Patent Office 2,865,391
Patented Dec. 23, 1958

2,865,391

MEANS FOR FILLING A BULK MILK CONTAINER FROM ONE OR MORE MILK CANS

Lloyd P. Duncan, Washington, Mo.

Application February 16, 1955, Serial No. 488,578

5 Claims. (Cl. 137—205)

This invention relates to a mechanism for draining milk cans into bulk milk containers without changing the structure of either.

A principal object of the invention, therefore, is to provide means for readily draining milk cans into a bulk milk container.

Another object is to provide a construction for draining milk from milk cans to a milk container which is comprised of a minimum number of parts and which utilizes the vacuum means of the bulk milk container.

An additional object is to provide means whereby the ordinary milk cans may be placed upon a support and drained, one by one, into a bulk milk container without necessitating the lifting of the milk cans beyond a certain height.

Other objects will appear hereinafter throughout the specification.

In the drawings:

Figure 1 is a perspective view of the apparatus with parts of the bulk milk container shown in section;

Figure 2 is a vertical sectional view partly broken away and partly in full lines of the strainer and other parts, and of the milk can and conduits;

Figure 3 is a vertical sectional view of the valve used;

Figure 4 is a perspective view, partly broken away and partly in vertical section, of a modified construction; and Figure 5 is a view similar to Figure 2 of a modified construction of a milk can, milk can cover and vacuum, and milk pipes connected to said cover.

Many farmers and other milk producers still use milk cans, these milk cans being filled by hand milking or by milking machines. When using a bulk milk container, it requires considerable strength to lift these milk cans up to the level of the pour-in connection of the bulk milk container and pour the milk into these bulk milk containers by hand. It is impossible for women and some men to lift the milk cans, one after the other, into position for pouring the milk from the cans into the bulk milk containers. The present device makes it possible for anyone, even children, to position the milk can to a position where the contents thereof may be readily caused to flow from the milk can into the bulk milk container. In hand milking, the milk, of course, is poured from the pail into the milk cans, which are usually of five or ten gallon capacity.

Referring to the drawings, the letter A indicates a bulk milk receptacle. The receptacle shown is of the fixed type, i. e., the container 10 which usually contains up to two hundred or more gallons of milk is mounted on legs 12 that are usually embedded in or otherwise fixed to a concrete floor 14.

The bulk milk receptacle is usually provided with outer and inner walls 16 and 18, respectively, and suitable insulation 20 is interposed between the walls. Mounted also within these walls are coils 22 which are in heat exchange relationship with the inner wall 18, so as to immediately chill the milk as it enters the receptacle and to maintain the milk at a given temperature. These coils connect to a conventional refrigerating mechanism B. Such mechanism is provided with the usual control means 24.

The cooling mechanism shown and the refrigerating mechanism also have been indicated diagrammatically because I do not desire to be limited to the specific cooling mechanism or refrigerating mechanism. In fact, spray cooling, such as shown in several of the prior patents and applications of George R. Duncan, may be used, but the coil chilling means shown is sufficient. Both coil chilling, spray chilling, and various types of refrigerating mechanism are well known and many different types of such mechanism may be used.

Referring again to Figure 1, the container or tank 10 is preferably provided with covers 26 and 28. Extending through the cover 28 is a vacuum pipe 30 having a screw cap 32 applied thereto. This pipe may be used when it is desired to draw the milk contents from the tank, inasmuch as the pipe extends closely adjacent to the inner wall 18. When the pipe 30 is connected to a suitable source of vacuum, such as a vacuum applying means used in connection with a milk truck, the cap 32 is unscrewed and the hose which is connected to the source of vacuum may be applied to the upper end of the pipe 30 for the purpose of emptying the tank of its contents.

The other cover 26 is provided with a pipe 34, the upper end of which has a valve 36. This valve is constructed in accordance with the proper standards in order to conform with State and Government regulations pertaining to the handling of milk by farmers, producers and others. The valve comprises a valve body 38 having passageways 40 and 42, the lower passageway being connected to the pipe 34 in a leakproof manner, and the passageway 42 being connected to the hose 44, also in a leakproof manner. The valve seat 46 and the surface 48 are very finely ground. The plug surface 48 forms part of the rotary plug 50, which latter is provided with a passage 52 extending therethrough and an operating handle 54. The valve plug is locked in position by a wedge member 56 which engages a wedge shaped aperture 58 in the valve plug. The other end of the flexible hose 44 is sealingly connected with a nipple 60 forming part of a combined strainer and can closure 62. This includes two dish-shaped members 64 and 66 which face each other, and the straight peripheral flanges 68 and 70 engage in circular recesses 72 and 74 of a collar 76 which is composed of soft rubber or rubber-like material, which latter partially sealingly engages the neck portion of an ordinary milk can C. It is necessary that the ring 76 sealingly engage the can. Thus it can be readily seen that when milk is to be transferred from a conventional milk can C to tank A, the operation is simplified in that close surveillance of the operation is not required. When sufficient milk is drawn from the can by vacuum, ring 76, which is correclty sized to sealingly engage the can, will prevent air from entering and breaking the vacuum in tank A.

Of course, an equilibrium will be reached when the pressures of can C and tank A are equalized and the seal may be simply broken by turning closure 62 askew to permit further draining of can C. However, when can C is almost fully drained, the closure 62 may be positioned in sealing engagement with can C and the operation need not be closely attended to since there is no likelihood of the vacuum in tank A being broken. When it is desired to replace can C, plug 50 may be turned by handle 54 and the vacuum in tank A will be maintained.

Cans or buckets having different sized openings where closure 62 does not sealingly engage the same may be drained by simply holding hose 44 with one hand and controlling valve plug 50 with the other hand, in which case, close surveillance of the draining operation must be maintained in order to prevent the vacuum in tank A from being destroyed.

In addition, the entire combined strainer and closure unit may be entirely removed by simply detaching the same from hose 44. Hose 44 may then be held in draining relationship with respect to can C.

The combined closure and strainer 62 may be employed to transfer and strain milk from all types of cans, buckets, etc., and when used with a container having an opening of the same size as a conventional milk can opening, this combined closure and strainer 62 will function to prevent the vacuum in tank A from being broken without being closely watched. The invention thus contemplates a suction hose having a filter between a refrigerated storage tank 10 and the cans, buckets, etc., from which the milk is to be transferred. The latter may rest on the floor, but are preferably supported upon a stool 78, preferably having short legs 80.

Clampingly engaged between the peripheral flanges 68 and 70 are the strainer supporting dish-like members 82 and 84, each of which is provided with a plurality of perforations 86 and 88. These members 82 and 84 are preferably held so as to clamp between them the strainer 90 which may be composed of any material, i. e., fabric, chamois, or fine mesh metal.

The lower dish-shaped member has an aperture 92, into which is fitted a pipe 94, by welding so as to form a tight fit, the lower end of which extends, as shown in Figure 1, almost to the bottom of the milk can.

Referring again to Figure 1, will be noted that I have provided an electric motor 96 having suitable gear mechanism 98 with a drive shaft 100 connected thereto. This drive shaft sealingly extends through the tank and has mounted on the end thereof an agitator 102. The purpose of the agitator is to gently stir the milk, the gear mechanism being employed to greatly reduce the R. P. M. of the electric motor as it is applied to the shaft 100.

It will be appreciated from the foregoing that, after the cows have been milked, the cans, one after the other, are placed on the stand or stool 78, and the combined strainer and can closure 62 is applied to the can as shown in Figure 2.

Assuming that the interior of the container wall 18 has been vacuumized, the valve 36 may then be operated by the handle 54 to apply a vacuum to the can C. This will result in the immediate draining of the contents of the can C into the tank 10, thus obviating the lifting of the can C to a place where it can be poured into the top of the tank. Care must be exercised in operating the valve 36. Unless this valve is promptly turned off as soon as milk has been exhausted from the can C, the vacuum within the tank A will be destroyed. The vacuum may be obtained and also maintained within the tank by means of the vacuum pipe 104 which sealingly extends through both walls of the tank into the interior thereof. This conduit 104 may be part of the conventional milk equipment. In other words, it may be attached to the vacuum lines of the milking machines within the enclosure of barn where the animals are milked.

Referring to the modified structure shown in Figures 4 and 5, the letter D indicates a tank having double walls and all of the accessories provided by tank A, not shown, however, in order to avoid repetition. Only the refrigeration mechanism E has been shown, and the cover 106 and the pipe 108, corresponding to pipe 34 have been illustrated. In the construction shown in Figure 4, a plurality of filled cans of milk may be simultaneoulsy emptied. The pipe 108 is connected to a pipe 110 having a hand operated valve 112 therein. This pipe 108 extends into a sleeve member 114 which sealingly extends through, by means of seal 116, the cover 118. The periphery 120 of this cover is of rubber or rubber-like material so as to sealingly engage the upper periphery of the milk can F. A plurality of said cans rest upon the support 122 having short legs 124. The sleeve 114 also supports a connecting pipe 126. There are a plurality of these second pipes 126 and a plurality of the constructions shown in Figure 5.

It will be noted that the sleeves and covers are similar to those in Figures 3, 4 and 5 of Patent 2,498,401, granted February 21, 1950, to George R. Duncan.

Assuming that a sub-atmospheric or partial vacuum pressure exists in the inner container of the tank D and that the valve 112 is in the off position, i. e., in the position where the said inner container is cut-off from communication with the cans F, and further assuming that at least one of which cans is filled or partly filled with milk, when it is desired to drain one or more of the cans into the tank, the valve is turned to about a 90° angle from its closed position so as to apply the vacuum in the tank to the cans. When this action has taken place, the cans are gradually drained into the tank, due to the connections between the interiors of the several cans and their connection to the vacuumized tank. The right-most pipe 126 is provided with a valve, diagrammatically illustrated at 150. Both valves 112 and 150 are turned to their closed positions when the right-most can has been drained, in order to avoid breaking the vacuum in the tank. When one or a series of cans has been drained of milk and the valves turned to their off position, it is easy to replace one or more of the cans with fresh cans having milk in them.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In a milking system comprising a bulk milk tank, said tank having inner and outer spaced walls, refrigerating means, means for cooling said inner walls connected to said refrigerating means, means for applying a vacuum to the interior of said tank, in combination, a portable milk can having a filling opening, a removable cover, means for partially sealing said cover to said can opening on said milk can, and a valve controlled conduit means connecting the interior of said bulk milk tank with the interior of said portable milk can, said conduit means extending through said cover and having a flexible portion secured to said tank and extending between said tank and cover, and having another portion extending from said cover to adjacent the bottom of said can.

2. The structure of claim 1 wherein said removable cover is provided with filter means.

3. The structure of claim 1 wherein said cover member is provided with a filter means, said filter means comprising a plurality of dish-like members, each dish member having a plurality of perforations.

4. The structure of claim 1 wherein said removable cover is provided with a collar of rubber-like material.

5. The structure of claim 1 wherein said removable cover is provided with a nipple whereby to attach the flexible portion of said conduit means to said cover, and means for attaching said portion extending from said cover to adjacent the bottom of said can to the underside of said cover.

References Cited in the file of this patent

UNITED STATES PATENTS

| | | |
|---|---|---|
| Re. 23,543 | Duncan | Sept. 2, 1952 |
| 994,864 | Montrose | June 13, 1911 |
| 1,202,050 | Gamble | Oct. 24, 1916 |
| 1,925,877 | Mitchum | Sept. 5, 1933 |
| 2,317,589 | Collinson | Apr. 27, 1943 |
| 2,527,849 | Ranney | Oct. 31, 1950 |
| 2,557,252 | Bannister et al. | June 19, 1951 |
| 2,603,396 | Redin et al. | July 15, 1952 |
| 2,616,809 | Graves | Nov. 4, 1952 |
| 2,702,019 | Duncan | Feb. 15, 1955 |